US012359776B2

(12) United States Patent

Alhajri et al.

(10) Patent No.: US 12,359,776 B2

(45) Date of Patent: Jul. 15, 2025

(54) PRESSURIZED CYLINDER STAND

(71) Applicant: Saudi Arabian Oil Company, Dhahran (SA)

(72) Inventors: Abdullah M. Alhajri, Dammam (SA); Musaad A. Awwad, Dammam (SA); Mohammed S. Al Jawfi, Al Khobar (SA); Jafar M. Alsadiq, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 137 days.

(21) Appl. No.: 18/190,689

(22) Filed: Mar. 27, 2023

(65) Prior Publication Data

US 2024/0328581 A1 Oct. 3, 2024

(51) Int. Cl.

*F17C 13/12* (2006.01)
*A47B 81/00* (2006.01)

(52) U.S. Cl.

CPC ............ *F17C 13/12* (2013.01); *A47B 81/007* (2013.01); *F17C 2201/058* (2013.01); *F17C 2221/032* (2013.01); *F17C 2260/04* (2013.01)

(58) Field of Classification Search

CPC .. F17C 13/12; F17C 13/084; F17C 2201/058; F17C 2201/0104; F17C 2201/032; F17C 2201/056; F17C 2221/032; F17C 2260/04; F17C 2203/0636; F17C 2205/0192;

(Continued)

(56) References Cited

U.S. PATENT DOCUMENTS 2,951,588 A * 9/1960 O'Neil ................ A47B 81/007 211/4
3,065,857 A * 11/1962 Sanders ................ F17C 13/084 211/85.19

(Continued)

FOREIGN PATENT DOCUMENTS

CN 208503946 2/2019
CN 208817079 5/2019

(Continued)

OTHER PUBLICATIONS

International Search Report and Written Opinion in International Appln No. PCT/US2024/021488, dated Jun. 12, 2024, 15 pages.

*Primary Examiner* — Stanton L Krycinski
(74) *Attorney, Agent, or Firm* — Fish & Richardson P.C.

(57) ABSTRACT

A pressurized cylinder stand includes a base, a plurality of vertical supports coupled to the base, a safety plate that includes bores configured to fit over the respective plurality of vertical supports, and a plurality of nuts. The base includes a safety cap that includes a seat configured to support a pressurized cylinder that encloses a pressurized hydrocarbon fluid. Each of the plurality of vertical supports includes a threaded portion and an unthreaded portion. The safety plate includes a slot sized to receive a base of the pressurized cylinder. At least two lower nuts are configured to engage the threaded portions of respective vertical supports in contact with a bottom surface of the safety plate. At least two upper nuts are configured to engage the threaded portions of respective vertical supports in contact with a top surface of the safety plate, such that the base of the pressurized cylinder is secured within the slot of the safety plate.

21 Claims, 4 Drawing Sheets

(58) Field of Classification Search
CPC ........ F17C 2223/0123; F17C 2223/036; F17C 2270/05; A47B 81/007
See application file for complete search history.

(56) References Cited

U.S. PATENT DOCUMENTS

| | | | | | |
|---|---|---|---|---|---|
| 3,602,368 | A * | 8/1971 | Gould | F17C 13/084 | 211/85.18 |
| 3,791,403 | A * | 2/1974 | Folkerth | F17C 13/084 | 211/85.18 |
| 4,481,972 | A * | 11/1984 | Stavlo | B66C 1/62 | 137/376 |
| 4,564,109 | A * | 1/1986 | Stavlo | B65D 19/44 | 294/67.1 |
| 4,899,968 | A * | 2/1990 | Eaglin | A47F 5/02 | 248/131 |
| 5,025,935 | A * | 6/1991 | Hadachek | B63C 11/02 | 224/543 |
| 5,074,421 | A * | 12/1991 | Coulter | F17C 13/084 | 211/163 |
| 5,176,265 | A * | 1/1993 | Bennett | A47F 7/28 | 137/376 |
| 5,542,576 | A * | 8/1996 | Arment | B65D 45/02 | 220/737 |
| 5,558,246 | A * | 9/1996 | Ross, Jr. | F17C 13/084 | 220/737 |
| 6,041,618 | A * | 3/2000 | Patel | B60H 1/3229 | 62/503 |
| 6,059,127 | A * | 5/2000 | Bennett | B62B 3/104 | 211/85.18 |
| 6,161,706 | A * | 12/2000 | McCord | F17C 13/084 | 211/85.18 |
| 6,508,477 | B2 * | 1/2003 | Burkett | F17C 13/085 | 248/346.11 |
| 6,708,719 | B2 * | 3/2004 | Idoguchi | F17C 13/084 | 222/135 |
| 7,017,741 | B1 * | 3/2006 | Williamson | F17C 13/084 | 206/386 |
| 7,137,474 | B2 * | 11/2006 | Yokote | F17C 13/084 | 248/500 |
| 7,543,667 | B2 * | 6/2009 | Hwang | H01M 8/04201 | 248/500 |
| 8,016,300 | B2 * | 9/2011 | Cramer | B65G 7/04 | 137/899.3 |
| 9,752,726 | B2 * | 9/2017 | Frenal | F17C 13/084 | |
| D827,764 | S * | 9/2018 | Mangeot-Gehin | D23/205 | |
| 10,458,599 | B2 | 10/2019 | Baune et al. | | |
| 10,677,391 | B2 * | 6/2020 | De Potter | G08B 21/18 | |
| 12,146,616 | B2 * | 11/2024 | Parisi | F17C 13/084 | |
| 2004/0035873 | A1 | 2/2004 | Wheeler | | |
| 2009/0000842 | A1 | 1/2009 | Hwang et al. | | |
| 2009/0084739 | A1 * | 4/2009 | Shock | F17C 13/084 | 211/75 |

FOREIGN PATENT DOCUMENTS

| | | | | |
|---|---|---|---|---|
| DE | 602005003731 | | 12/2008 | |
| GB | 2440901 | A * | 2/2008 | A47B 81/007 |
| WO | WO 2001051334 | | 7/2001 | |

* cited by examiner

PRESSURIZED CYLINDER STAND

TECHNICAL FIELD

The present disclosure describes systems and methods associated with a pressurized cylinder stand.

BACKGROUND

In the oil and gas industry, hydrocarbon samples, especially gas samples, are collected in the field using different sizes of sample containers. The hydrocarbon sample can be stored at a pressure above atmospheric pressure and, in some cases, much greater than atmospheric pressure. High pressure sample storage can require very strict safety measurements when draining the sample out of the cylinder. A conventional lab method of draining pressurized cylinders is by holding the cylinder using pressure clamps on a lab bench. Then, the cylinder caps are depressurized using pressure regulators in order to safely drain the sample. This method raises a very alarming safety issue, as in some instances, the cylinders are not safely secured so that they can launch into the air due to a high pressure release to cause a catastrophic safety issue.

SUMMARY

In an example implementation, a pressurized cylinder stand includes a base configured to be supported by a support surface, a plurality of vertical supports coupled to the base, a safety plate that includes bores configured to fit over the respective plurality of vertical supports, and a plurality of nuts. The base includes a safety cap that includes a seat configured to support a pressurized cylinder that encloses a pressurized hydrocarbon fluid. Each of the plurality of vertical supports includes a threaded portion and an unthreaded portion. The safety plate includes a slot sized to receive a base of the pressurized cylinder. At least two lower nuts of the plurality of nuts are configured to engage the threaded portions of respective vertical supports in contact with a bottom surface of the safety plate. At least two upper nuts of the plurality of nuts are configured to engage the threaded portions of respective vertical supports in contact with a top surface of the safety plate, such that the base of the pressurized cylinder is secured within the slot of the safety plate.

In an aspect combinable with the example implementation, the pressurized cylinder includes a 981 CC gas cylinder.

In another aspect combinable with any of the previous aspects, the pressurized hydrocarbon fluid is at between 7000 and 10,000 psi.

In another aspect combinable with any of the previous aspects, the seat of the safety cap includes a non-sparking material.

In another aspect combinable with any of the previous aspects, the non-sparking material includes a PVC ring.

In another aspect combinable with any of the previous aspects, the seat includes a bore sized to accept a release opening of the pressurized cylinder.

In another aspect combinable with any of the previous aspects, at least some of the base, the plurality of vertical supports, or the safety plate is included of galvanized steel.

Another aspect combinable with any of the previous aspects further includes a back plate coupled to the base, the back plate including a plurality of holes.

Another aspect combinable with any of the previous aspects further includes at least one clamp configured to secure the pressurized cylinder to the back plate by engaging the clamp around the pressurized cylinder and to at least one of the plurality of holes of the back plate.

In another aspect combinable with any of the previous aspects, the base includes a plurality of feet configured to contact the support surface to support the base on the support surface.

In another example implementation, a method includes moving a pressurized cylinder that contains a pressurized hydrocarbon fluid onto a seat formed in a base of an adjustable stand for the pressurized cylinder such that a release opening of the pressurized cylinder is engaged with the seat. The adjustable stand includes a plurality of vertical supports coupled to the base, with each of the plurality of vertical supports including a threaded portion and an unthreaded portion; a safety plate that includes bores and a slot sized to receive a base of the pressurized cylinder; and a plurality of nuts. The method further includes adjusting a distance between the safety plate and the base to engage a base of the pressurized cylinder into the slot; adjusting at least two lower nuts of the plurality of nuts to engage the threaded portions of respective vertical supports to be in contact with a bottom surface of the safety plate; adjusting at least two upper nuts of the plurality of nuts to engage the threaded portions of respective vertical supports to be in contact with a top surface of the safety plate; and based on the adjusting of the at least two lower nuts and the at least two upper nuts, securing the base of the pressurized cylinder within the slot of the safety plate.

In an aspect combinable with the example implementation, the pressurized cylinder includes a 981 CC gas cylinder.

In another aspect combinable with any of the previous aspects, the pressurized hydrocarbon fluid is at between 7000 and 10,000 psi.

In another aspect combinable with any of the previous aspects, the seat of the safety cap includes a non-sparking material.

In another aspect combinable with any of the previous aspects, the non-sparking material includes a PVC ring.

In another aspect combinable with any of the previous aspects, the seat includes a bore sized to accept a release opening of the pressurized cylinder.

In another aspect combinable with any of the previous aspects, at least some of the base, the plurality of vertical supports, or the safety plate is included of galvanized steel.

Another aspect combinable with any of the previous aspects further includes a back plate coupled to the base, the back plate including a plurality of holes.

Another aspect combinable with any of the previous aspects further includes securing the pressurized cylinder to the back plate by engaging at least one clamp around the pressurized cylinder and to at least one of the plurality of holes of the back plate.

In another aspect combinable with any of the previous aspects, the base includes a plurality of feet configured to contact a support surface to support the base on the support surface.

Another aspect combinable with any of the previous aspects further includes, subsequent to securing the base of the pressurized cylinder within the slot of the safety plate, operating the release opening of the pressurized cylinder to release at least a portion of the pressurized hydrocarbon fluid from the pressurized cylinder.

Implementations of systems and methods that include a pressurized cylinder stand according to the present disclosure can include one, some, or all of the following features. For example, a pressurized cylinder stand according to the present disclosure can prevent or help prevent a launch action of a pressurized cylinder secured in the stand during release of a pressurized fluid. As another example, a pressurized cylinder stand according to the present disclosure can prevent or help prevent a spark or ignition of a hydrocarbon fluid released from a pressurized cylinder secured in the stand.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
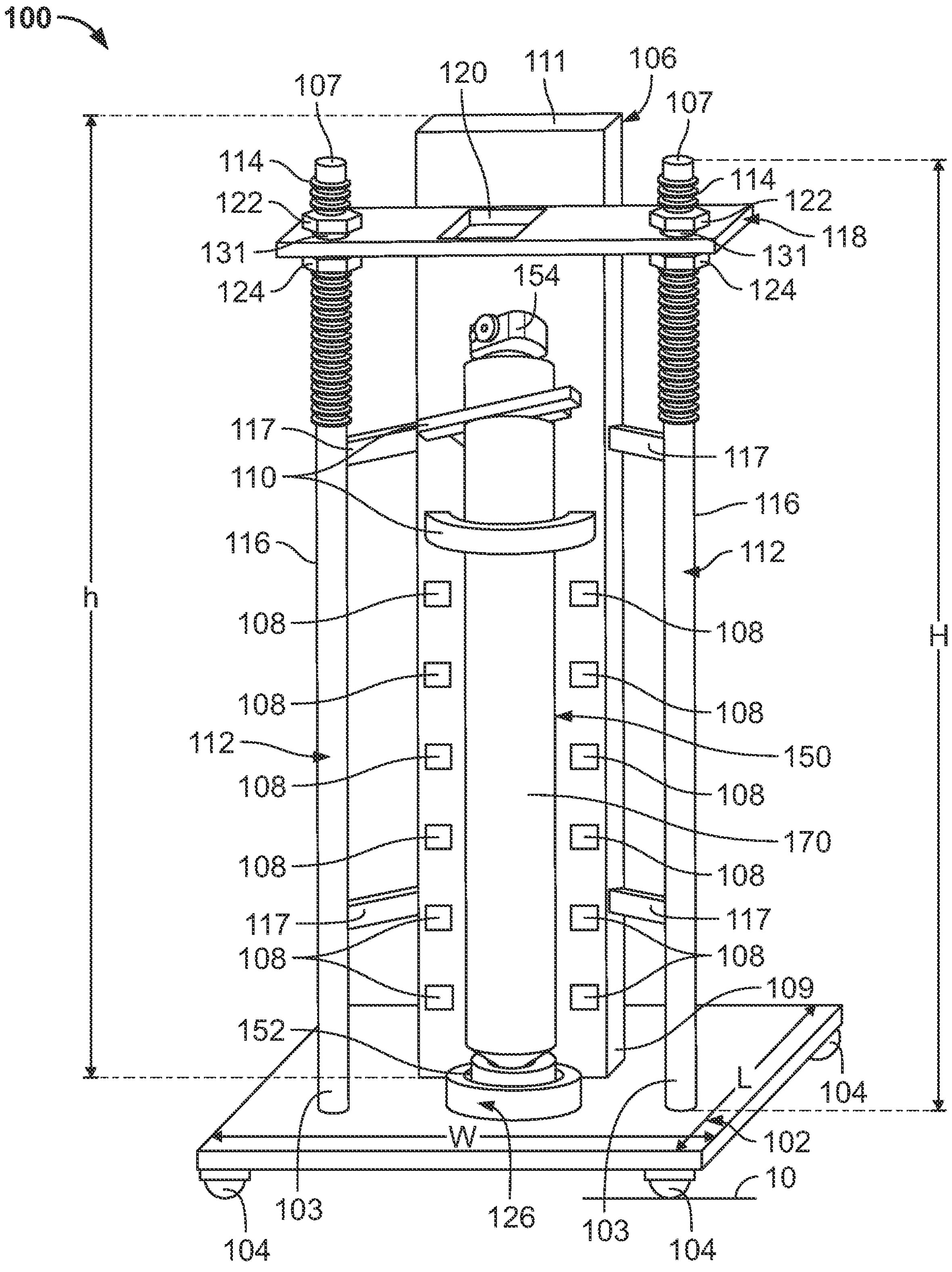
FIG. 1 is a schematic illustration of an example implementation of an adjustable stand for a pressurized cylinder according to the present disclosure.

FIG. 1 is a schematic illustration of an example implementation of an adjustable stand 100 for a pressurized cylinder 150 according to the present disclosure. In some aspects, the adjustable stand 100 can provide safe operation for handling, for instance, highly pressurized hydrocarbon gas cylinders such as the pressurized cylinder 150. Such pressurized cylinders (like cylinder 150) can be used in the oil and gas industry to contain, for example, hydrocarbon samples such as hydrocarbon (or a mixed composition) gas, which are collected at an oil and gas operational facility (for example, a rig or otherwise) using different sizes of sample containers. Pressurized cylinder 150 can represent many such cylinders that are used to hold a hydrocarbon fluid (such as gas). In some aspects, the pressurized cylinder 150 is a titanium 981 CC gas cylinder that can hold a relatively large quantity of gas under a relatively high pressure (for example, up to 7000 psi).

Such high pressure requires very strict safety measurements when draining a portion of the sample gas out of the cylinder. Typically, a lab method of draining pressurized cylinders is by holding the cylinder using pressure clamps/vice on a lab bench. But such conventional methods often allow for escape of the cylinder from the lab bench when the highly pressurized sample is released, which can provide for a dangerous situation. Adjustable stand 100, in contrast, can provide for safe handling of pressurized cylinder 150 that securely holds the cylinder 150 during release of a pressurized fluid 170 there within.

As shown, this example implementation of the adjustable stand 100 includes a base 102 that includes one or more feet 104 (four in this example) that are designed to sit on a support surface 10 (for example, a table, floor, or otherwise). In this example, the base is generally quadrilateral in shape (for example, square or rectangle) with a width, W, that can be, for example, about 50 cm, and a length, L, that can be, for example, about 30 cm. The base 102 supports and is coupled to vertical supports 112 (two in this example), as well as a back plate 106.

As shown in this example, the vertical supports 112 are comprised of rods that are each connected (for example, welded or otherwise) at a first end 103 to the base 102 and otherwise unconnected at a second end 107. Each vertical support 112, in this example and as a rod, includes a threaded portion 114 and an unthreaded portion 116. In the illustrated implementation, a total height, H, of the vertical supports 112 can be about 85 cm, with the unthreaded portion 116 being about 69 cm and the threaded portion 114 being about 16 cm.

As shown in FIG. 1, the vertical supports 112 are connected (for example, welded or otherwise) to the back plate 106 by arms 117 (four in this example). The back plate 106, as shown, is generally rectangle and has a height, h, of about 89 cm. The back plate 106 is also connected (for example, welded or otherwise) at a first end 109 and unconnected at a second end 111. The back plate 106 also included, in this example, holes 108 that are formed as pairs of holes 108 across a width of the back plate 106 and columns of holes 108 along at least a portion of the height, h, of the back plate 106. In certain aspects, one or more clamps 110 can be inserted into the holes 108 and wrap around the pressurized cylinder 150 (as shown) to secure or help secure the cylinder 150 to the back plate 106 (and thus the adjustable stand 100).

As further shown in FIG. 1, a safety plate 118 can be installed onto the vertical supports 112 to also secure or help secure the pressurized cylinder 150 to the adjustable stand 100. For instance, the safety plate 118 includes a slot 120 formed in the plate 118 (for example, generally centralized in the plate 118). The slot 120 can be sized (dimensionally and/or shaped) to fit over a base 154 of the pressurized cylinder 150. The safety plate 118, as well, can include bores 131 that fit over the vertical supports 112 (as rods in this example). Each bore 131, for instance, is sized and/or shaped to fit over and down the vertical supports 112 such that the safety plate 118 is positioned a desired distance from the base 102 (for example, depending on a height of the pressurized cylinder 150). In some aspects, the bores 131 can include threads as well.

Once positioned at the desired (and adjustable) location, the safety plate 118 can be secured by lower nuts 124 and upper nuts 122, which are threaded onto the threaded portion 114 to secure the safety plate 118 to the vertical supports 112. In some aspects, the safety plate 118, once secured, can hold the pressurized cylinder 150 to prevent or help prevent the cylinder 150 from launching away from the adjustable stand 100 due to a high-pressure release of the fluid 170 there within. The safety plate 118, in some aspects, can hold up to 10,000 psi pressure exerted by the cylinder 150 (for example, in a generally upward direction away from the base 102).

Figure 2:
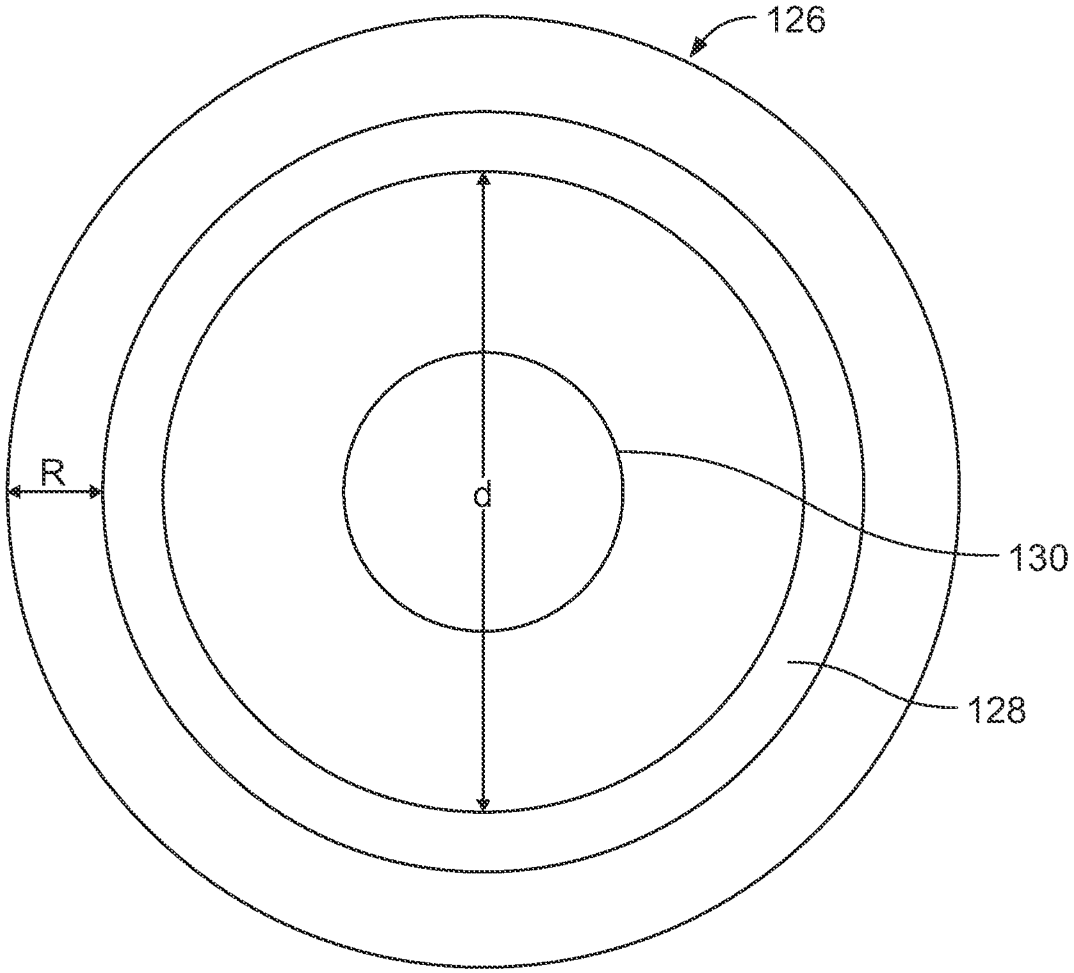
FIG. 2 is a schematic illustration of a portion of the example implementation of the adjustable stand for a pressurized cylinder of FIG. 1 that includes a safety cap according to the present disclosure.

The base 102, in this example, can also include a safety cap 126 (described in more detail with reference to FIG. 2). The components of the adjustable stand 100, in some aspects, can be formed or made from galvanized steel (and in some aspects, painted). Turning to FIG. 2, this figure is a schematic illustration of a portion of the example implementation of the adjustable stand 100 for the pressurized cylinder 150. As shown in FIGS. 1 and 2, the safety cap 126 is formed in the base 102 and provides for a seat on which a release opening 152 of the pressurized cylinder 150 is supported when the cylinder 150 is secured in the adjustable stand 100. The release opening 152 can comprise a valve or cap or other component that can be manipulated (for example, opened) to release at least a portion of the hydrocarbon fluid 170 stored in the pressurized cylinder 150 (at high pressure, such as up to 7,000 psi and even 10,000 psi).

As shown in FIG. 2, the safety cap 126 includes a non-sparking ring 128 formed or mounted on the safety cap 126. The non-sparking ring 128, for example, can comprise a polyvinylchloride (PVC) surface on which the release opening 152 sits and which prevents any potential sparks or ignition during release of the hydrocarbon fluid 170 from the pressurized cylinder 150. In some aspects, the slot 120 can also include a non-sparking cover or material positioned thereon to prevent or help prevent potential sparks or ignition during release of the hydrocarbon fluid 170 from the pressurized cylinder 150. Such sparks could be generated for example, by friction contact between the safety cap 126 and pressurized cylinder 150 and/or between the safety plate 118 and pressurized cylinder 150 that ignites the released hydrocarbon fluid 170.

As further shown in FIG. 2, the safety cap 126 includes a bore 130 radially centered in the safety cap 126. Although both the safety cap 126 and the bore 130 are shown as circles, other shapes, as appropriate for the release opening 152 of the cylinder 150, can be used in alternative implementations. In some aspects, the bore 130 has a diameter, d, of about 10-11 cm, while a ring portion 140 of the safety cap 126 has a dimension, R, of about 3 cm.

Figure 3:
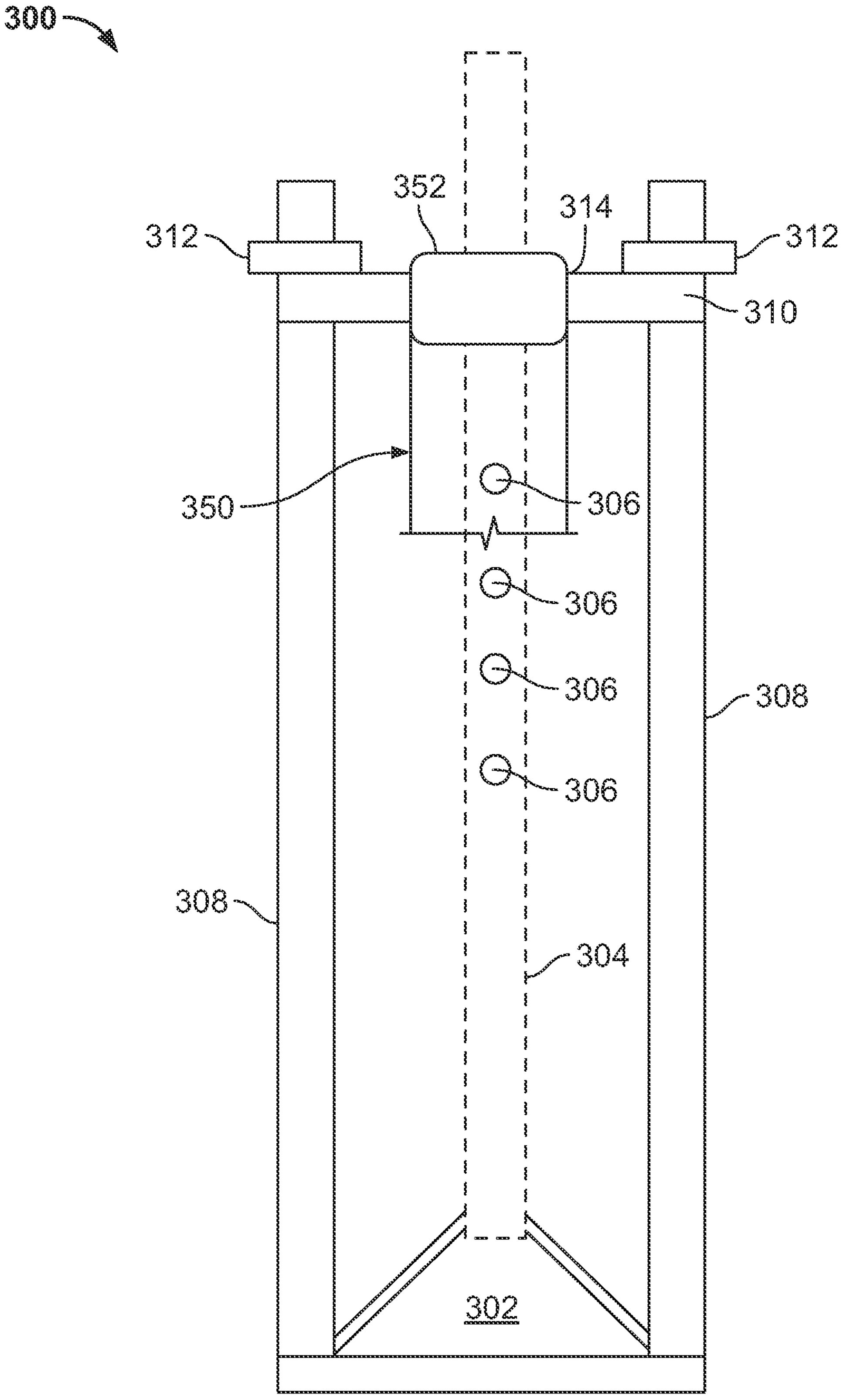
FIG. 3 is a schematic illustration of a front view of another example implementation of an adjustable stand for a pressurized cylinder according to the present disclosure.
Figure 4:
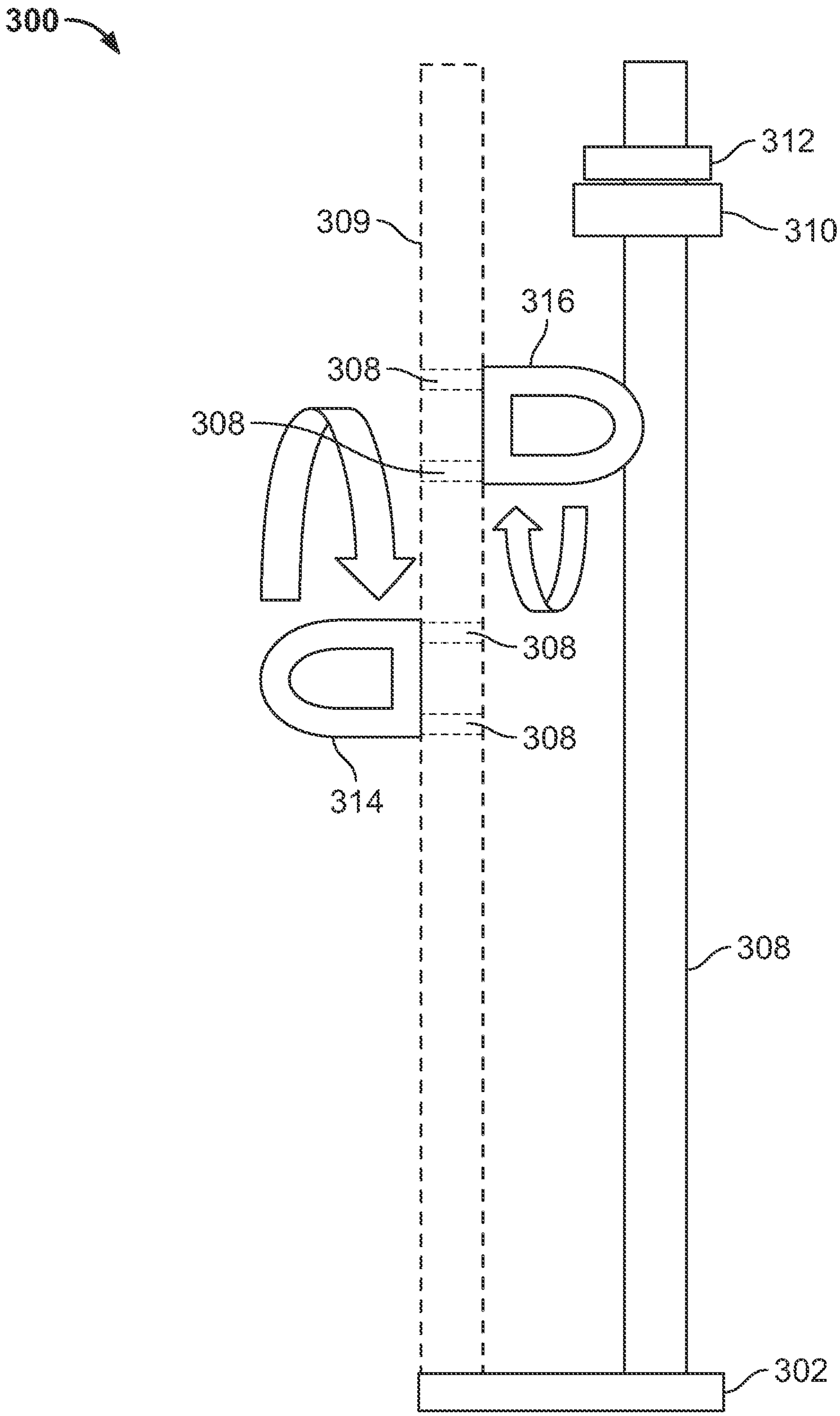
FIG. 4 is a schematic illustration of a side view of the other example implementation of the adjustable stand for a pressurized cylinder of FIG. 3 according to the present disclosure.

FIGS. 3 and 4 are schematic illustrations of a front view and side view, respectively, of another example implementation of an adjustable stand 300 for a pressurized cylinder according to the present disclosure. The adjustable stand 300, while different than adjustable stand 100, can be used to perform similar functionality to secure a pressurized cylinder (represented by a portion of a cylinder 350 with a base 352) so that release of a pressurized hydrocarbon fluid from the cylinder does not cause a "launch" event of the cylinder. As shown, the adjustable stand 300 includes a base 302 which is coupled to vertical supports 308 and a back plate 304. In some aspects, the vertical supports 308 can be threaded or partially threaded rods onto which a safety plate 310 can be secured with nuts 312 at a desired distance from the base 302.

As shown, the back plate 304 includes holes 306 into which clips 316 (shown in FIG. 4) can be installed. The clips 316 can be positioned around a pressurized cylinder to secure the cylinder to the back plate 304, in addition to the base 352 of the cylinder 350 being secured within a slot 314 of the safety plate 310.

In an example operational process applicable to the examples of the adjustable stand 100 and the adjustable stand 300, and using the adjustable stand 100 as an example, the pressurized cylinder 150 can be positioned on the base 102 such that the release opening 152 of the cylinder 150 is inserted into the safety cap 126. The release opening 152 can be exposed or otherwise accessible through the bore 130 of the safety cap 126 to allow pressurized hydrocarbon fluid 170 to be released from the cylinder 150.

The pressurized cylinder 150 can be further secured to the adjustable stand 100 at the back plate 106. For example, one or more clamps 110 can be wrapped around the cylinder 150 and then secured into the holes 108. In some aspects, a clamp 110 can be secured to pairs of holes 108 that are horizontally adjacent. In some aspects, a clamp 110 can be secured to pairs of holes 108 that are not horizontally adjacent but are diagonally related. In some aspects, with relation to adjustable stand 300, clips 316 can be inserted into vertically adjacent holes 306. Once secured, the clamps 110 (or 316) can hold or help hold the pressurized cylinder 150 to the back plate 106.

The pressurized cylinder 150 can be further secured to the adjustable stand 100 by the safety plate 118. For example, before or after the pressurized cylinder 150 is seated in the base 102 (for example, the release opening 152 seated in the safety cap 126), the safety plate 118 can be moved so that the base 154 of the pressurized cylinder 150 is inserted into or otherwise engaged by the slot 120 of the safety plate 118. In some aspects, movement of the lower nuts 124 (for example, threading) and/or movement of the upper nuts 122 (for example, threading) is performed in order to seat the safety plate 118 onto the pressurized cylinder 150 so that the base 154 is engaged into the slot 120.

Once the base 154 is engaged into the slot 120, the lower nuts 124 can be moved (for example, threaded) and/or the upper nuts 122 can be moved (for example, threaded) on the threaded portions 114 of the vertical supports 112 so that the safety plate 118 is, for example, tightly held between the upper nuts 122 and lower nuts 124 to secure the pressurized cylinder 150 to the safety plate 118.

Once the pressurized cylinder 150 is secured to and within the adjustable stand 100, the release opening 152 can be manipulated to release at least a portion of the pressurized hydrocarbon fluid 170 from the pressurized cylinder 150. During release, the pressurized cylinder 150 can be held securely within the adjustable stand 100 without launching or otherwise undesirably moving.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A pressurized cylinder stand, comprising:
a base configured to be supported by a support surface, the base comprising a safety cap that comprises a seat configured to support a pressurized cylinder that encloses a pressurized hydrocarbon fluid;
a plurality of vertical supports coupled to the base, each of the plurality of vertical supports comprising a threaded portion and an unthreaded portion;
a safety plate that comprises bores configured to fit over the respective plurality of vertical supports, the safety plate comprising a slot sized to receive a base of the pressurized cylinder; and
a plurality of nuts, comprising:
at least two lower nuts of the plurality of nuts configured to engage the threaded portions of respective vertical supports in contact with a bottom surface of the safety plate, and
at least two upper nuts of the plurality of nuts configured to engage the threaded portions of respective vertical supports in contact with a top surface of the safety plate, such that the base of the pressurized cylinder is secured within the slot of the safety plate.

2. The pressurized cylinder stand of claim 1, wherein the pressurized cylinder comprises a 981 CC gas cylinder.

3. The pressurized cylinder stand of claim 1, wherein the pressurized hydrocarbon fluid is at between 7000 and 10,000 psi.

4. The pressurized cylinder stand of claim 1, wherein the seat of the safety cap comprises a non-sparking material.

5. The pressurized cylinder stand of claim 4, wherein the non-sparking material comprises a PVC ring.

6. The pressurized cylinder stand of claim 1, wherein the seat comprises a bore sized to accept a release opening of the pressurized cylinder.

7. The pressurized cylinder stand of claim 1, wherein at least some of the base, the plurality of vertical supports, or the safety plate is comprised of galvanized steel.

8. The pressurized cylinder stand of claim 1, further comprising a back plate coupled to the base, the back plate comprising a plurality of holes.

9. The pressurized cylinder stand of claim 8, further comprising at least one clamp configured to secure the pressurized cylinder to the back plate by engaging the clamp around the pressurized cylinder and to at least one of the plurality of holes of the back plate.

10. The pressurized cylinder stand of claim 1, wherein the base comprises a plurality of feet configured to contact the support surface to support the base on the support surface.

11. A method, comprising:
moving a pressurized cylinder that contains a pressurized hydrocarbon fluid onto a seat formed in a base of an adjustable stand for the pressurized cylinder such that a release opening of the pressurized cylinder is engaged with the seat, the adjustable stand comprising:
a plurality of vertical supports coupled to the base, each of the plurality of vertical supports comprising a threaded portion and an unthreaded portion,
a safety plate that comprises bores and a slot sized to receive a base of the pressurized cylinder, and
a plurality of nuts;
adjusting a distance between the safety plate and the base to engage a base of the pressurized cylinder into the slot;
adjusting at least two lower nuts of the plurality of nuts to engage the threaded portions of respective vertical supports to be in contact with a bottom surface of the safety plate;
adjusting at least two upper nuts of the plurality of nuts to engage the threaded portions of respective vertical supports to be in contact with a top surface of the safety plate; and
based on the adjusting of the at least two lower nuts and the at least two upper nuts, securing the base of the pressurized cylinder within the slot of the safety plate.

12. The method of claim 11, wherein the pressurized cylinder comprises a 981 CC gas cylinder.

13. The method of claim 11, wherein the pressurized hydrocarbon fluid is at between 7000 and 10,000 psi.

14. The method of claim 11, wherein the seat formed in the base comprises a non-sparking material.

15. The method of claim 14, wherein the non-sparking material comprises a PVC ring.

16. The method of claim 11, wherein the seat comprises a bore sized to accept a release opening of the pressurized cylinder.

17. The method of claim 11, wherein at least some of the base, the plurality of vertical supports, or the safety plate is comprised of galvanized steel.

18. The method of claim 11, further comprising a back plate coupled to the base, the back plate comprising a plurality of holes.

19. The method of claim 18, further comprising securing the pressurized cylinder to the back plate by engaging at least one clamp around the pressurized cylinder and to at least one of the plurality of holes of the back plate.

20. The method of claim 11, wherein the base comprises a plurality of feet configured to contact a support surface to support the base on the support surface.

21. The method of claim 11, further comprising, subsequent to securing the base of the pressurized cylinder within the slot of the safety plate, operating the release opening of the pressurized cylinder to release at least a portion of the pressurized hydrocarbon fluid from the pressurized cylinder.

* * * * *